April 26, 1938.  J. STEIN  2,115,151
ORNAMENTAL RUBBER MATERIAL
Filed Feb. 8, 1936  5 Sheets-Sheet 1
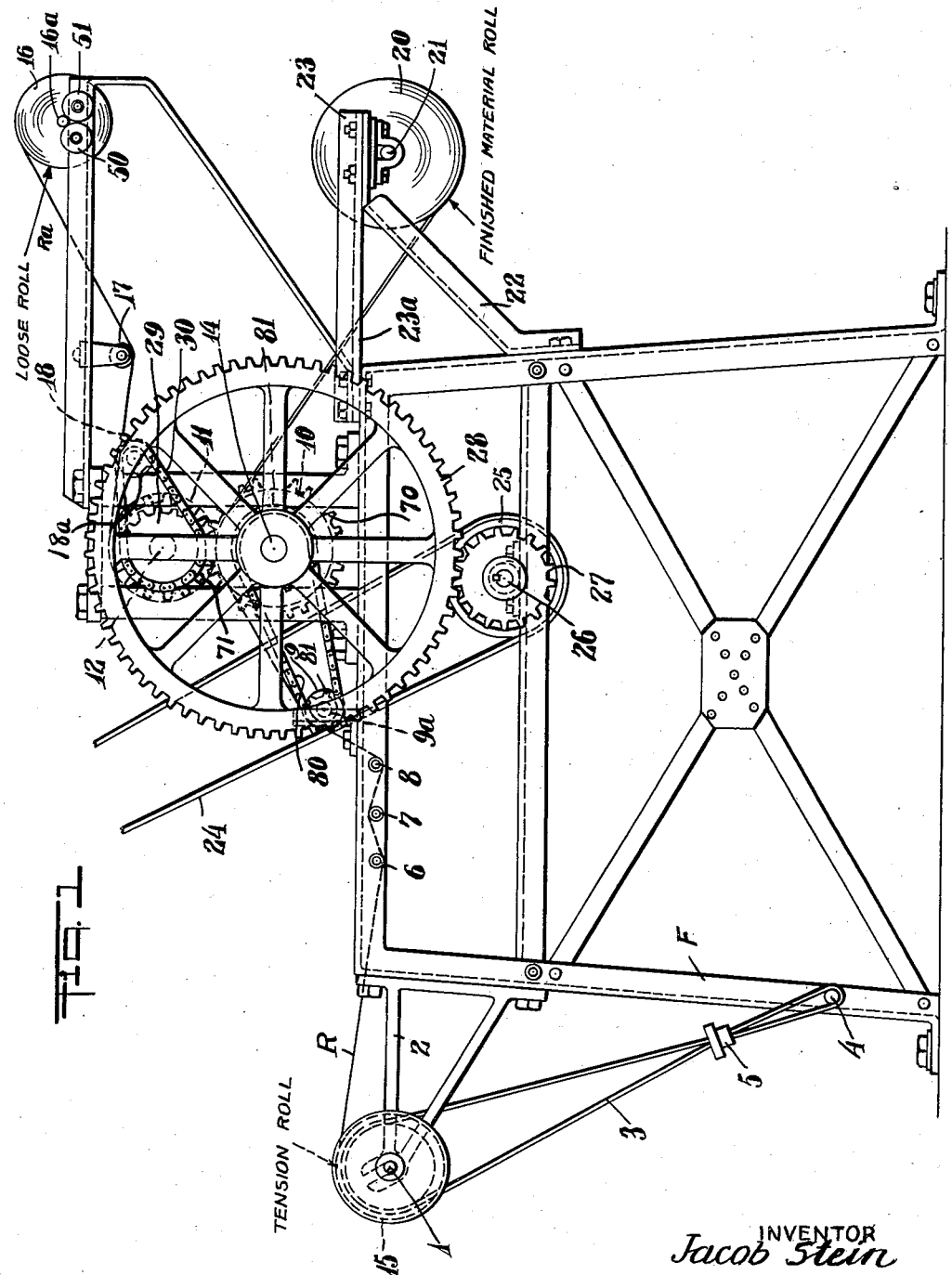
INVENTOR
Jacob Stein
BY Mock & Blum
ATTORNEYS

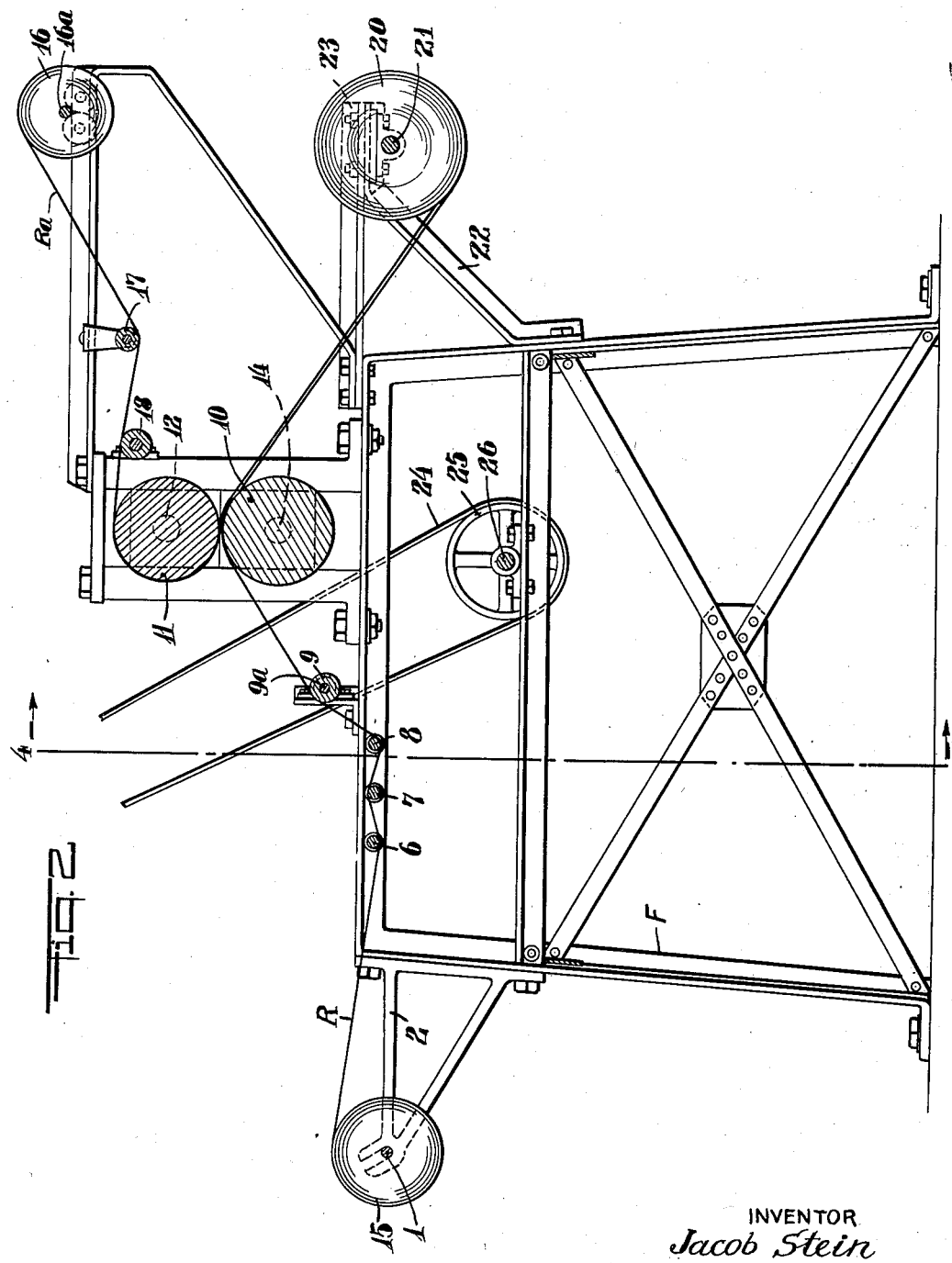

April 26, 1938.   J. STEIN   2,115,151
ORNAMENTAL RUBBER MATERIAL
Filed Feb. 8, 1936   5 Sheets—Sheet 3
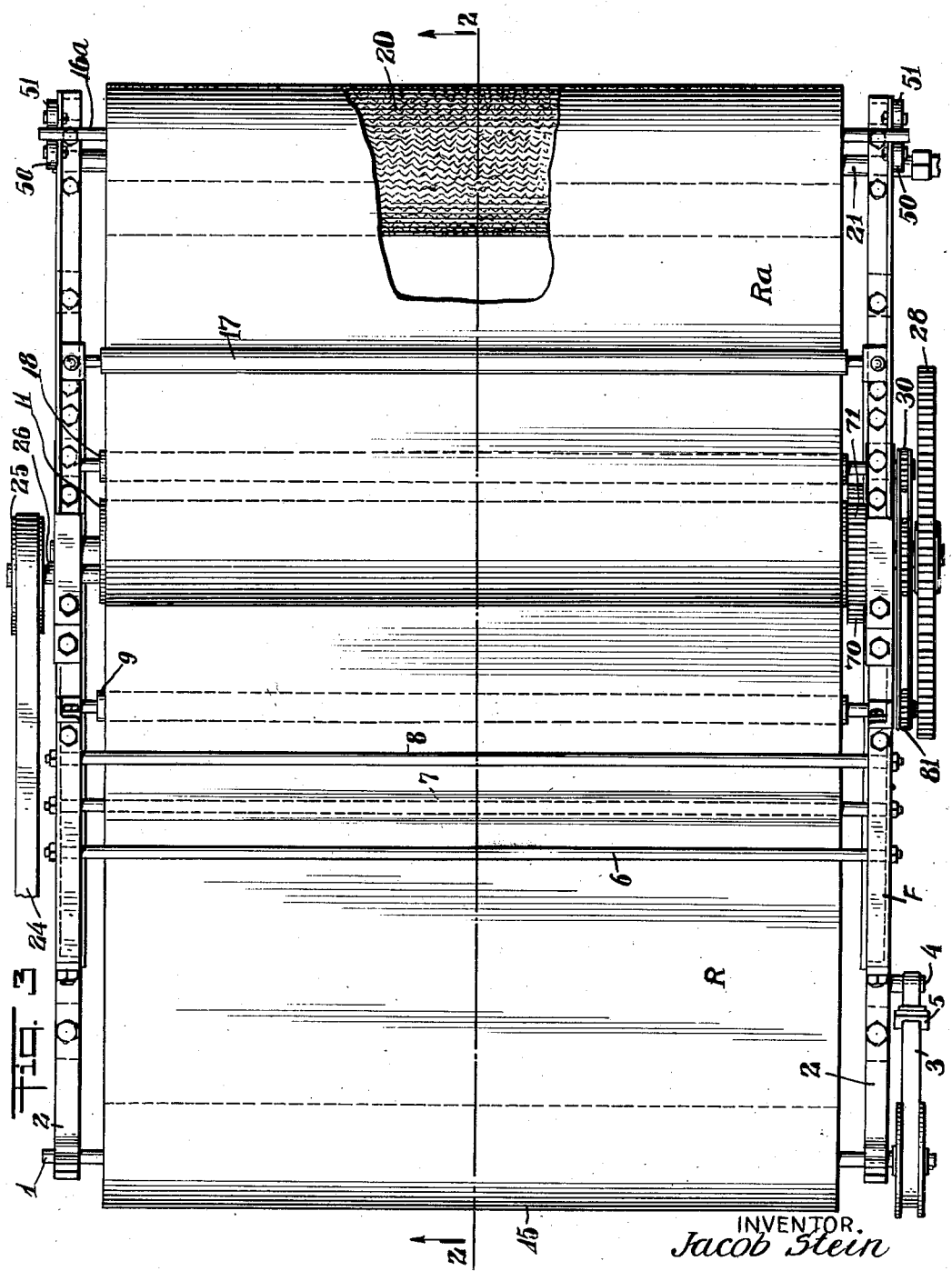
INVENTOR.
Jacob Stein
BY Mock & Blum
ATTORNEYS

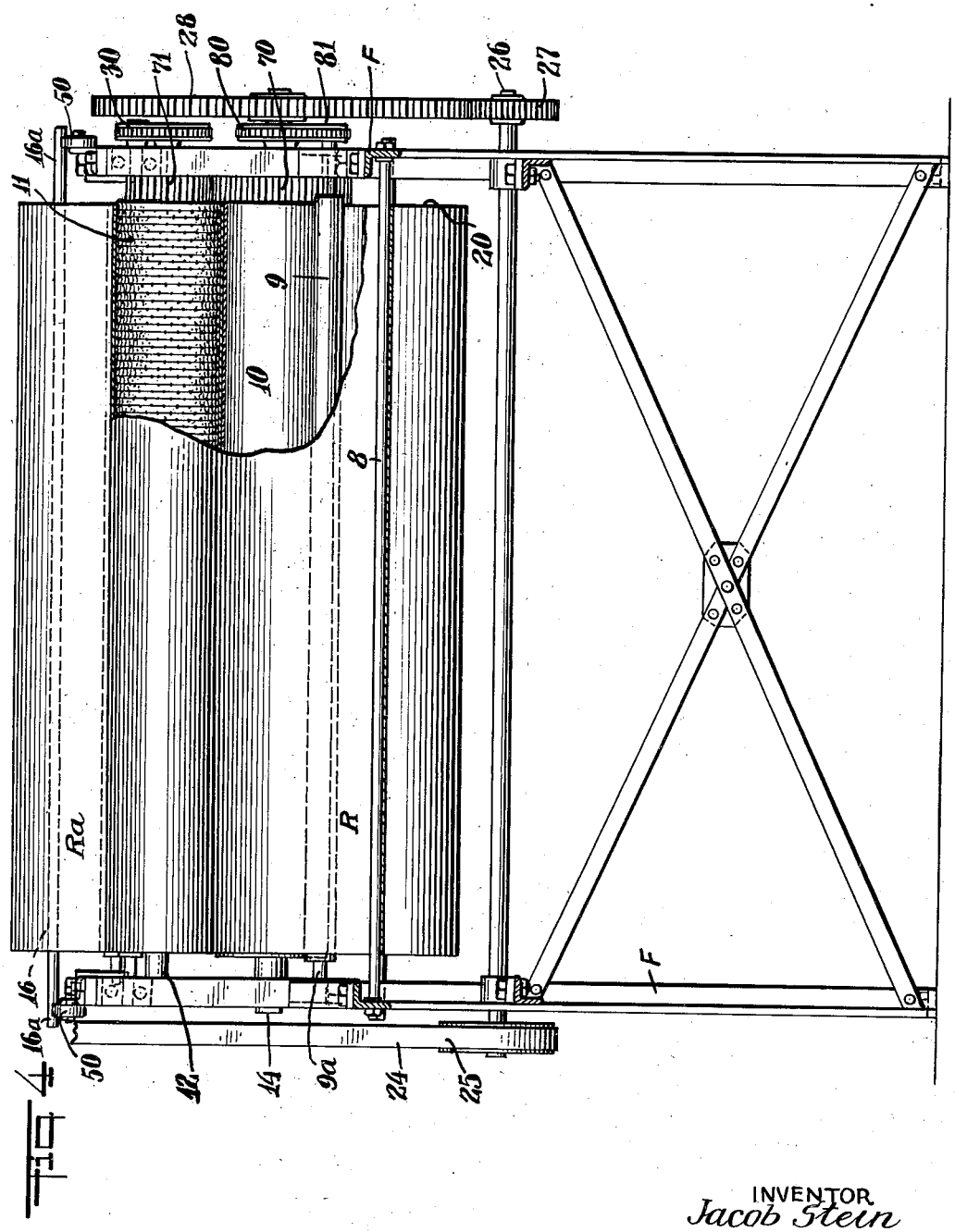

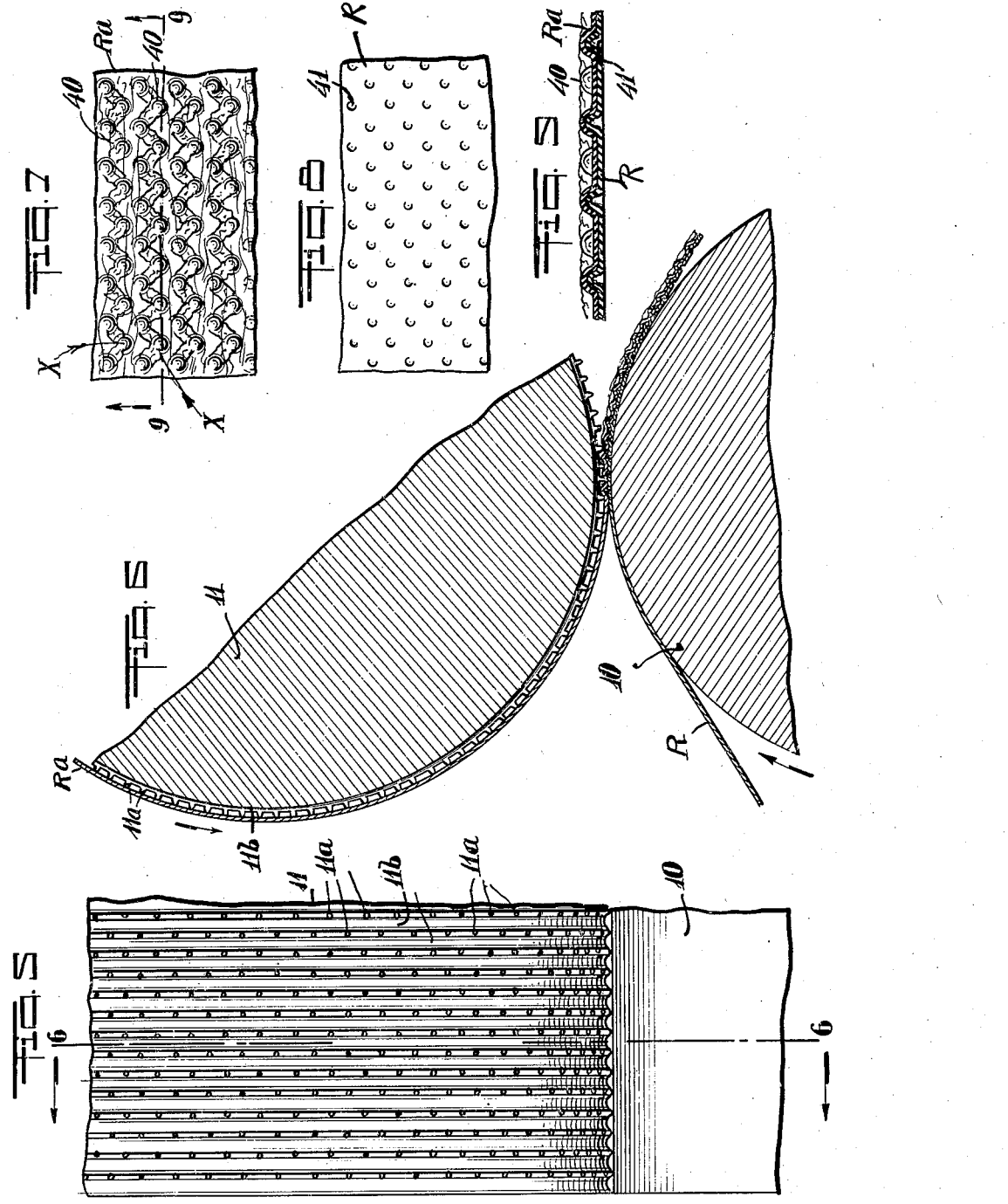

Patented Apr. 26, 1938

2,115,151

UNITED STATES PATENT OFFICE 2,115,151

ORNAMENTAL RUBBER MATERIAL

Jacob Stein, New York, N. Y.

Application February 8, 1936, Serial No. 62,955

2 Claims. (Cl. 154—55)

The invention relates to a new and improved method of making ornamental rubber material, and to a new and improved mechanism for making such ornamental material.

One of the objects of this invention is to produce an ornamental material which is made of two or more separate sheets of rubber or other material, which have been suitably joined.

Another object of the invention is to provide an ornamental fabric made wholly or partially of rubber or other stretchable material, which has been creped so as to produce a herringbone effect, or other surface effect. The invention makes it possible to secure various ornamental surface designs, such as a wavy or circular pattern, or a sinusoidal pattern.

Another object of the invention is to provide said ornamental effect, or other ornamental effect, by joining two sheets of rubber under suitable pressure, while causing one of said sheets to travel slightly faster than the other sheet.

Another object of the invention is to provide an improved method whereby the above effect is secured upon one of two sheets of rubber or other material, the other sheet of rubber or other material, having a different surface appearance than the first-mentioned sheet.

Other objects of the invention will be stated in the following description and drawings, which illustrate preferred embodiments thereof, it being understood that the above general statement of the objects of the invention is intended generally to explain the same, without limiting it in any manner.

Fig. 1 is a side elevation of the improved machine.

Fig. 2 is a sectional view on the line 2—2 of Fig. 3.

Fig. 3 is a top plan view of Fig. 1.

Fig. 4 is a sectional view on the line 4—4 of Fig. 2.

Fig. 5 is a partial elevation of the pair of rollers which are used in the machine.

Fig. 6 is a sectional view on the line 6—6 of Fig. 5.

Fig. 7 is a top plan view showing the fair side of the combined rubber material, when a herringbone effect is produced.

Fig. 8 is a bottom plan view of the material whose fair side is illustrated in Fig. 7. The side of the material which is illustrated in Fig. 7, is ordinarily exposed to view, and the side which is shown in Fig. 8, may be considered as being the rear face of the material.

Fig. 9 is a sectional view on the line 9—9 of Fig. 7.

In the particular embodiment described herein the ornamental material is made by joining or doubling two sheets of rubber. However I do not wish to be limited to the use of rubber, since I may utilize other stretchable materials. Likewise the invention can utilize one sheet of stretchable material, and another sheet of relatively non-stretchable material.

Assuming that the combination material is made from two sheets of rubber, then, as shown in Fig. 1, one of the sheets of material R is wound upon a tension roll 15. Said roll 15 has a shaft or spindle 1, which is turnably mounted in the forked bearings of arms 2 of a frame F. A frictional resistance is imposed against the turning of the roll 15, by means of a band 3 which passes around a pulley which is provided upon the shaft or spindle 1 of the roll 15. Said band 3 is preferably endless, and one of its ends passes around a pin 4, which is fixed to the frame F. Said member 3 also passes through a collar 5, which may be adjusted if desired, in order to increase the tension of the band 3, and the frictional effect secured thereby. The band 3 does not move when roll 15 is turned.

The member 3 may be made of leather, or of any other suitable material.

Referring again to Fig. 1 and to Fig. 2, the material R, which may be smooth material, is led under an idler roll 6, over an idler roll 7, under an idler roll 8; then over a driven roll 9, and then over the surface of a lower drum 10, which is mounted upon a shaft 14. The members 6, 7, and 8 can turn freely.

The second sheet of material Ra, which can be made of rubber if desired, is wound upon a roll or drum 16. This roll 16 is provided with a shaft or spindle 16a, which is provided with an anti-friction support, by means of freely turnable rolls 50 and 51. As indicated in Fig. 1 by the legend "loose roll", the roll 16 can turn very freely, so that the material Ra can be unwound under little or no tension.

The material Ra passes underneath a freely turnable idler 17, and said material then passes over a positively driven and turnable roll 18. Said material Ra then passes around an upper drum 11, so that the sheets of material R and Ra are subjected to pressure by the drums 11 and 10. This pressure joins such sheets of material, and the combination material is then wound upon a roll 20, which has a shaft or spindle 21. This roll 20 may be turned by hand or by any suitable device. A bearing is provided for said shaft or spindle 21, said bearing comprising members 23 and 23a, which are suitably fixed to the frame F of the machine.

The machine is driven by means of a belt 24, which is driven from any suitable source of power. Said belt 24 drives a pulley 25, which is located on the shaft 26. Said shaft 26 is provided with a small gear 27, which meshes with a larger gear 28, which is mounted upon the shaft 14 of the lower roll 10. The lower roll 10 is thus driven directly. The bearings of the shafts 14 and 12 of the rolls 10 and 11 are of any suitable type, so that the rolls 10 and 11 press together the sheets of material which are fed between them.

The shaft 14 of roll 10 is also provided with a gear 70, which meshes with an upper gear 71 upon the shaft 12, so that roll 11 is driven by gear 71. The pitch diameter of gear 71 is half that of gear 70, so that roll 11 turns two revolutions for each revolution of roll 10. Since said rolls 11 and 10 may have the same diameter, although roll 10 may be of greater diameter than roll 11, the material Ra is fed twice as fast as material R. This ratio may be varied. Said shaft 12 has a sprocket 29, and said sprocket 29 is provided with a chain 30, which drives a sprocket 18a, which is mounted upon the shaft of the roll 18.

The shaft 14 also has a sprocket, which drives sprocket 81 on the shaft 9a of roll 9, by means of chain 80. The rolls 18 and 9 positively feed the respective sheets of material R and Ra, at above mentioned different speeds to the rolls 11 and 10, so that the material is positively fed to each roll, at the peripheral speed of said roll.

As shown in Figs. 5 and 6, the lower roll 10 has a smooth or cylindrical periphery.

The upper roll 11 is provided with outwardly and radially projecting teeth 11a. As shown in Fig. 5, said teeth 11a are arranged in rows, which are located in spaced planes, said planes being perpendicular to the axis of said roll 11. Said rows of teeth 11a are separated by intermediate portions 11b, which have a smooth and concave contour. Likewise, and as shown in Fig. 5, the teeth 11a of adjacent rows are arranged in staggered relation.

The material R is fed between the rolls 11 and 10 while said material R is stretched and while it is under tension. The material Ra is fed between said rolls 11 and 10 while said material Ra is substantially or wholly unstretched and while said material Ra is under little or no tension. If the sheets of material R and Ra are made of rubber, said rubber may be vulcanized or it may be partially vulcanized. Said sheets of rubber are connected to each other at spaced points which correspond to the teeth 11a. Said teeth 11a form projections or bosses 41 in the stretched material R, and said teeth 11a form corresponding projections or bosses 40, in the material Ra. Said projections 40 and 41 interlock as shown in Fig. 9. Said bosses are both longitudinally and laterally separated from each other.

After the two sheets of material have been thus connected at spaced points, the tension upon the material R is released, after the sheets of joined material have passed beyond the pressure zone which is located between the rolls 11 and 10.

The stretched material R now contracts to normal shape between the points at which said material R is joined or connected to the material Ra.

The effect is to pucker or wrinkle the unstretched material Ra, and the stretched material R contracts to normal dimensions, without the formation of any substantial puckers or wrinkles in said material R. This increases the puckering effect on material Ra, which has been produced by the more rapid feed thereof between the rolls 11 and 10. Said more rapid feed causes the material Ra to form puckers or wrinkles between the points 11a.

The material Ra is thus puckered or wrinkled along consecutive series of lines, each said series including line elements which are inclined to each other.

In the specific embodiment which is illustrated in the drawings, each said series of line elements forms a zig-zag line and a herringbone effect is secured.

However the teeth 11a may be arranged so that the line elements in each series form an irregular line of any desired contour.

After the sheets of material have been thus assembled, they may be vulcanized by means of a cold cure or by any other method of vulcanization which may exclude the use of pressure, so that the shape of the assembled sheets is not changed by the vulcanization.

While I have shown the joining of two sheets of material, the invention may be applied to the joining of two or more sheets of material.

Likewise I do not wish to exclude the use of adhesive for joining the sheets of material.

Whenever I refer in the claims to a first sheet of material and to a second sheet of material, it is to be understood that I wish to include the use of three or more sheets.

Referring to Fig. 7, it may be assumed that the direction of feed of the sheets of material between the rolls is indicated by the arrows which are associated with the section line 9—9.

As shown in Fig. 7, the material Ra is puckered in a succession of series and each said series has line elements, and the line elements of each series constitute an irregular line, as distinguished from a straight line.

If the junction points indicated by X in Fig. 7 were eliminated, by eliminating the corresponding teeth 11a, the puckers or wrinkles would be formed between the remaining junction points and said puckers or wrinkles would be formed in the direction of the arrows indicated in Fig. 7, thus producing a different ornamental effect and a different type of composite material.

I do not wish to exclude from the invention a method whereby the material Ra is maintained under tension while it is joined to the material R, but in such case the material R is maintained under greater tension and stretch than the material Ra. In practice, the material Ra is stretched and tensed to a certain extent, in order to unwind said material from the roll 16. Hence, in addition to relying on the puckering effect which is secured by the more rapid feed of sheet Ra, I prefer to tense and stretch sheet R, in order to allow for some stretch of sheet Ra, and to increase the puckering effect which is secured by the differential feed.

I have shown the stretched material below the relatively unstretched material, while said sheets of material are being joined. However, this relationship is not essential as the stretched material may then be above the unstretched material.

Under such circumstances, and if desired, the relationship of the drums may be reversed so that the drum 10 is above the drum 11. Likewise the drums 11 and 10 may be maintained in the relationship shown in Fig. 2, even if the stretched material is above the unstretched material.

I have shown preferred embodiments of my invention but it is clear that numerous changes and omissions can be made without departing from its spirit.

I claim:

1. An ornamental elastic material comprising a first sheet of elastic material and a second sheet of elastic material, said two sheets having spaced interconnected upstanding bosses arranged along substantially parallel lines which are spaced from each other, the bosses in each line being staggered relative to the bosses in the adjacent lines, only one of said sheets of material having upstanding puckered portions intermediate said bosses, the adjacent bosses being substantially equally spaced both longitudinally and laterally.

2. An ornamental elastic material comprising a first sheet of elastic material and a second sheet of elastic material, said two sheets being connected to each other at spaced upstanding embossed areas, one of said sheets of material having puckered portions intermediate said spaced areas, said puckered portions being arranged in series, the puckered portions of each series forming an irregular line.

JACOB STEIN.